Jan. 7, 1958
F. S. SLICK
2,819,129
ROLLER BEARING
Filed Sept. 9, 1954
2 Sheets-Sheet 1
Fig. 1.
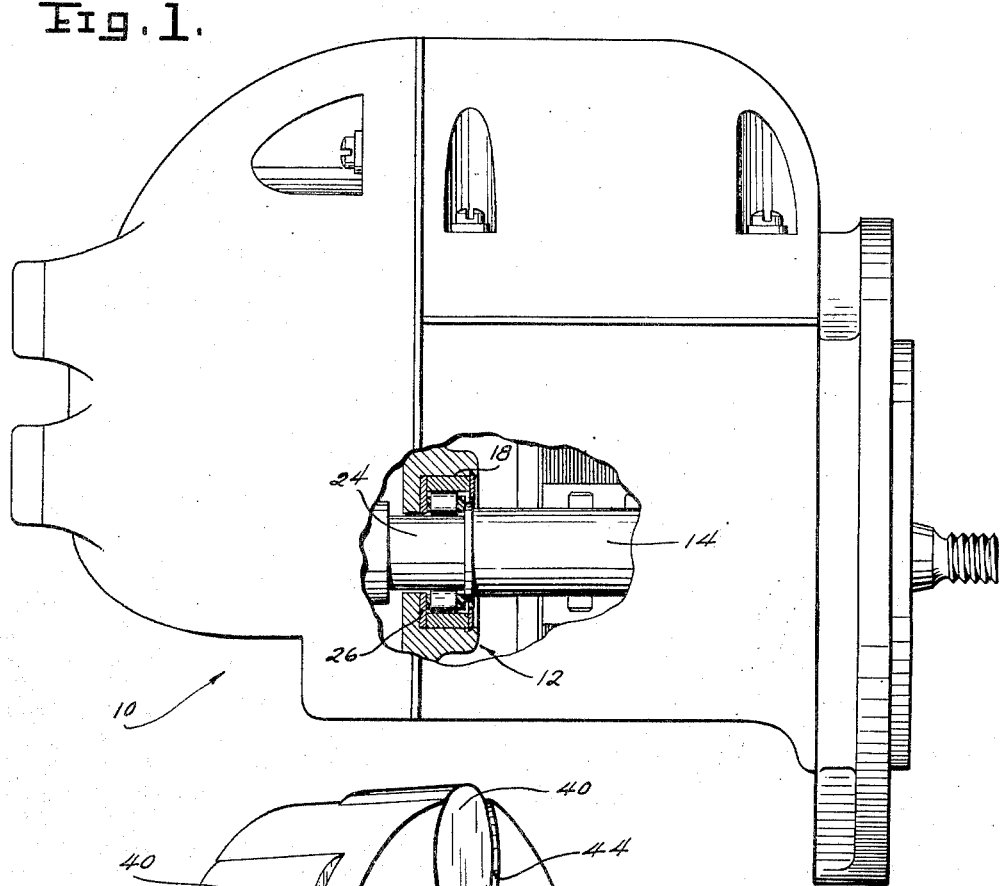
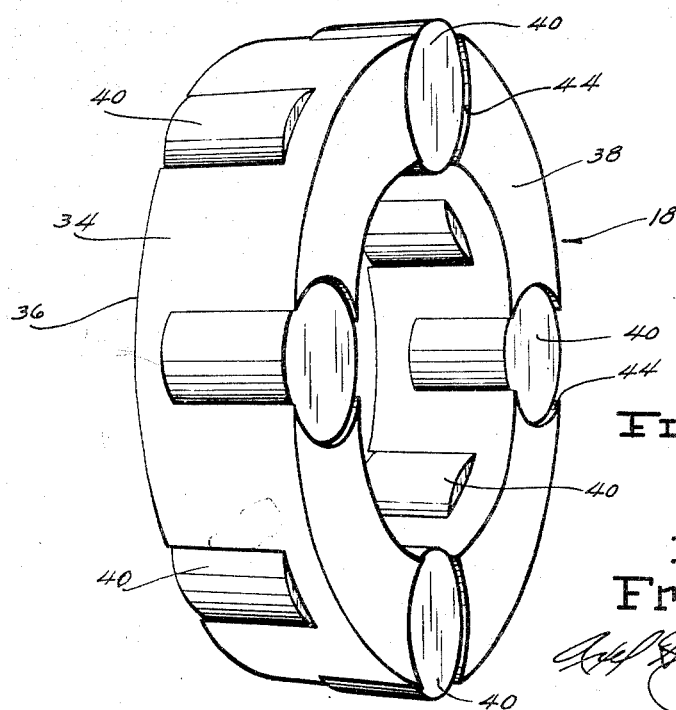
Fig. 2.
INVENTOR:
Fred S. Slick
Agent

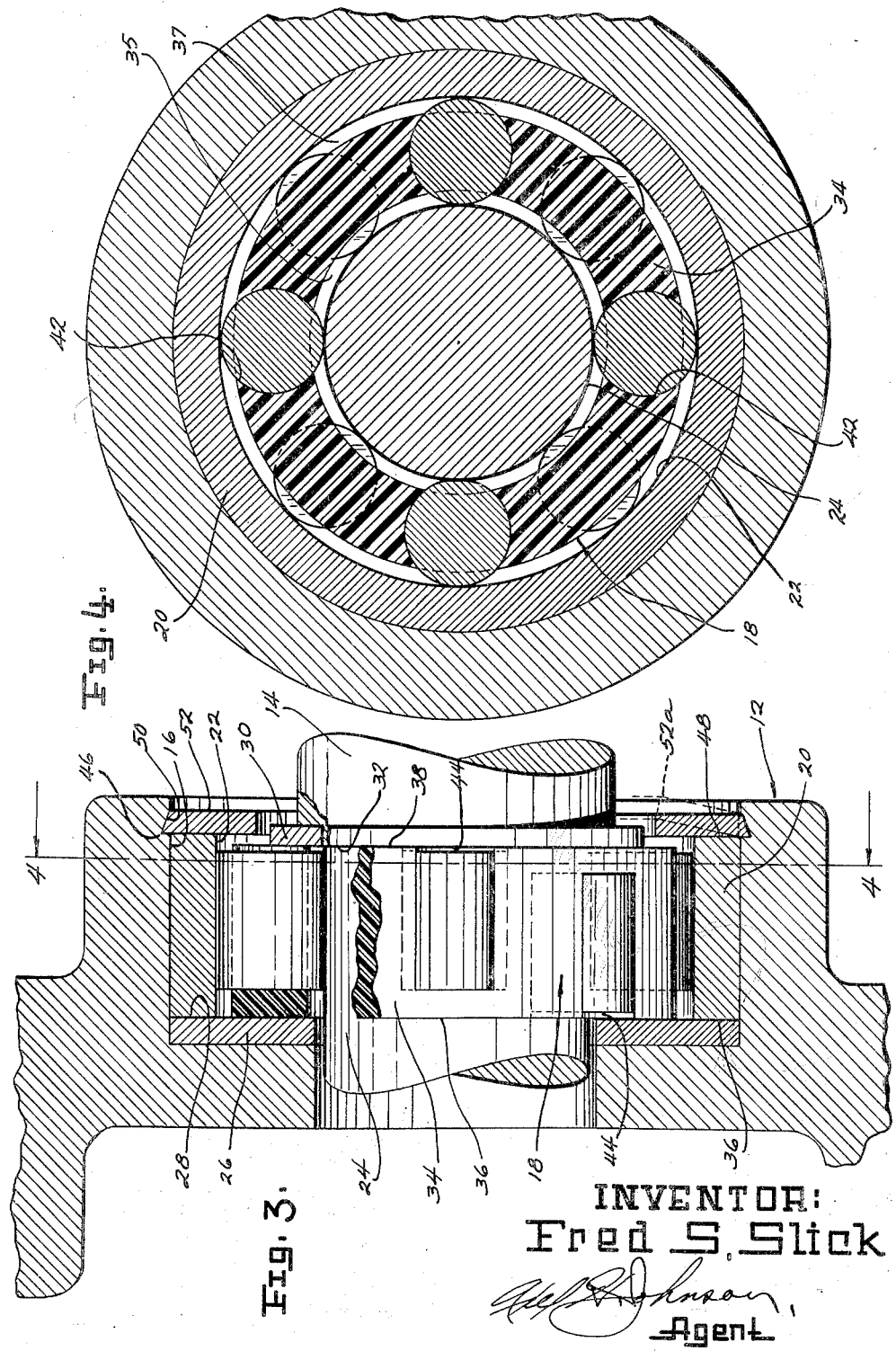

United States Patent Office 2,819,129
Patented Jan. 7, 1958

2,819,129

ROLLER BEARING

Fred S. Slick, Rockford, Ill., assignor to J. I. Case Company, Racine, Wis., a corporation of Wisconsin Application September 9, 1954, Serial No. 454,881

1 Claim. (Cl. 308—207)

This invention relates to a bearing for the armature shaft of a magneto and the like, especially to the type of bearing having cylindrical rollers supported in a retainer or cage.

Considerable attention has been given to providing an economical roller bearing that will take care of thrust loads, as well as radial loads, on a magneto shaft. A novel feature of this bearing is a retaining cage that also serves as a thrust bearing.

In light installations, such as in magnetos where the load is light, it is not necessary to provide bearings of the very highest precision, especially with respect to the thrust bearing. Bearings of the type disclosed in this application have been found to be entirely satisfactory under severe conditions.

One of the novel features of this invention is the employment of a molded plastic as the material for the retaining cage and which retainer also provides the thrust bearing surfaces.

The lubrication of thrust bearings having plane surfaces is difficult, owing to the large areas involved, and the deficiency often results in abrading of these surfaces. To remedy this trouble, lubricant grooves are sometimes provided on these surfaces in order to facilitate lubrication reaching all points. However, the provision of grooves is not entirely satisfactory in that they reduce the actual bearing surface and thereby increase the unit pressure, thereby causing scoring of the surfaces.

An important feature of this invention is the employment of a polyamide plastic resin as the material for the retaining cage. This material being self-lubricating permits the end faces of the retainer to be used satisfactorily as elements of the thrust bearing.

As before mentioned, a novel feature of the invention is the use of a plastic called polyamide resin, popularly known as nylon, as the material for the retaining cage, the end surfaces of the cage providing the surfaces for the thrust bearing. No special provision for lubricating the thrust surfaces is necessary in that the polyamide resin has self-lubricating properties. Other properties of this plastic that recommend it for use as a bearing are that it is able to readily conform to complementary surfaces, and it absorbs heat and thereby helps to maintain a cool bearing. It is shock absorbing and thereby absorbs shocks that tend to otherwise crystallize shafts and bearing rolls.

The ability of the retaining cage to conform to complementary bearing surfaces is especially important in that the thrust collar on the shaft need not have such a high degree of finish as would be required for metal-to-metal thrust bearings.

An object of this invention is to provide an economical combined radial roller and thrust bearing.

Another object is to provide a combined roller and thrust bearing that requires no special attention to lubricate the thrust surface.

Another object is to provide an improved bearing having provision for improved lubrication of the rollers.

Another object is to provide a bearing having a retaining cage capable of absorbing shocks and would thereby operate quietly.

Further objects and advantages of this invention will be apparent from a consideration of the following detailed description taken in connection with the accompanying drawings, wherein a satisfactory embodiment of the invention is shown. However, it is to be understood that the invention is not limited to the details disclosed, but includes all such variations and modifications as fall within the spirit of the invention.

Referring to the drawings, Fig. 1 is a side elevational view of a magneto with a portion broken out to show the invention.

Fig. 2 is an enlarged perspective view of the complete bearing assembly.

Fig. 3 is a fragmentary enlarged view, partially in section, of a part of the magneto frame with the bearing and shaft in place, and Fig. 4 is an enlarged sectional view taken at 4—4 of Fig. 3.

Referring to Fig. 1, of the drawing, 10 is a magneto of a well-known type having a frame 12 and an armature shaft 14 supported in a bearing at each end of the shaft. Both bearings are identical, so only one will be shown and described.

Frame 12 is provided with a cavity 16 which accommodates a bearing assembly 18, which is clearly shown in Figs. 1 to 4. An outer race 20 is assembled in cavity 16 and which is an accurate fit therein. Race 20 is provided with an inner bore 22, which is accurately concentric with the journal portion 24 of shaft 14.

One of the novel features of this invention is the provision of an axial thrust bearing employing the end surfaces of the retaining cage as an element of the thrust bearing. A thrust washer 26 of hardened steel is fitted to the bottom of cavity 16 as shown in Figs. 1 and 3. The surface 28 of washer 26 is finished sufficiently smooth to serve as an axial thrust bearing surface. Washer 26 is held in place in cavity 16 by race 20 in a manner clearly shown in Fig. 3. Frame 12 and washer 26 have bores therethrough sufficiently large to permit freedom for portion 24 of shaft 14 as shown in Figs. 3 and 4.

Shaft 14 is provided with a thrust shoulder 30 which has a thrust surface 32 adjacent portion 24 and normal to the axis of shaft 14. Surface 32 is opposed to the surface 28 of washer 26 for reasons which will appear. In this instance, shoulder 30 comprises an annular member pressed against a shoulder on shaft 14 in order to simplify manufacture. However, shoulder 30 could be integral with shaft 14.

A novel feature of this invention is the bearing assembly 18 embracing the novel form of retaining cage of plastic, and the positioning of the bearing rollers. Referring to the drawings, 34 is a retaining cage which, in this instance, is of a thermo-plastic resin, and which, in this instance, is a polyamide known popularly as nylon. This material has several properties that tend to make it suitable for use as a bearing material. Among these properties is the ability to conform readily to irregularities of cooperating bearing surfaces, to resist scoring and abrading, and the property of self-lubrication. Polyamide resin is also flexible, not apt to break and will not show appreciable wear over long periods of operation when used as a bearing surface. This material also absorbs heat readily.

Retaining cage 34 is in the form of an annulus and is located in the annular space between portion 24 and bore 22 of outer race 20. Annular clearance spaces 35 and 37 are provided for purposes which will appear.

Retaining cage 34 is of an axial length sufficient to extend from surface 28 of thrust washer 26 to thrust surface 32 of thrust shoulder 30. The axially-spaced end surfaces 36 and 38 of cage 34 comprise the thrust surfaces that contact surfaces 28 and 32 respectively as shown in Fig. 3.

Eight (8) cylindrical rollers 40 are employed in this instance, and are spaced uniformly about the periphery of retaining cage 34 as shown in Figs. 2 and 3. Rollers 40 have their axes mutually parallel with each other and with the axis of portion 24 of shaft 14. Rollers 40 are of a diameter to provide a rolling contact between portion 24 and the inner bore 22 of outer race 20. The dimensions of portion 24, bore 22 of outer race 20, and rollers 40 are so proportioned as to provide proper running clearances between the several parts.

A cavity 42 is provided in cage 34 for each roller 40 as shown in Figs. 2, 3 and 4. Cavities 42 have their end openings on alternate thrust surfaces 36 and 38 of cage 34 as shown in Figs. 2 and 3. Thus, there are only four (4) openings on each of surfaces 36 and 38; therefore, there is ample surface remaining to serve as a thrust bearing surface.

The axial length of cavities 42 is substantially less than the axial length of cage 34, as will appear from Figs. 2 and 3, resulting in cage 34 being a unitary continuous annular member. The cavities 42 are of a diameter to permit rollers 40 to rotate freely and to permit lubricant to be carried around the rollers.

A novel feature of the invention is the staggering of alternate rollers 40 in an axial direction. This is clearly shown in Figs. 2 and 3. The effect of thus staggering the rollers 40 is to provide a longer axial support for shaft 14 than would be possible were rollers 40 not so staggered. This feature also provides improved lubrication.

Cavities 42 are of an axial depth slightly in excess of the length of rollers 40, as indicated at 44 of Figs. 2 and 3, the purpose being to assure that rollers 40 will not protrude beyond the end surfaces 36 and 38 and thereby interfere with mutual contact of surfaces 28 and 36 or surfaces 32 and 38. Excess 44 also permits axial freedom for rollers 40, thereby diminishing, to some extent, the danger of grooving portion 24 of shaft 14.

When bearing assembly 18 has been assembled as shown in Fig. 3 and with shaft 14 in place, axial thrust will be met by contact of surfaces 28 and 36 in one direction and by surfaces 32 and 38 in the other direction.

Cavity 16 of frame 12 has an annular groove 46 machined therein with one face of the groove forming a continuation of surface 48 of outer race 20. The peripheral face 50 of groove 46 converges as shown.

A retaining ring 52 is employed to hold outer race 20 in place as shown in Fig. 3. Ring 52 is punched from sheet steel or other suitable material of a suitable thickness and having a central hole substantially larger than shoulder 30 of shaft 14. The washer is then formed concave as shown by dotted lines and indicated 52a in Fig. 3. The outer periphery of washer 52a is then machined as part of a cylindrical surface and to a diameter so that it will just enter cavity 16. When the assembly is being made, retaining ring 52 is placed in cavity 16 in contact with the surface 48 of outer race 20 and then pressed to its original flat condition. When so pressed in place, the periphery will conform to the peripheral face 50 of groove 46 and thereby secure the outer race in place in cavity 16.

It should be understood that the opposed bearing, not shown, is assembled with its members axially opposed in relation to bearing 18 so that axial thrust of shaft 14 is met alternately by either bearing.

Various modes of carrying out the invention may be employed within the scope of the accompanying claim, which particularly points out and distinctly sets forth the subject matter regarded as the invention.

I claim:

In a housing having a bearing cavity and a rotatable shaft coaxial with said cavity, said shaft being provided with an integral axially-normal thrust portion, a fixed thrust member in said cavity spaced axially from said normal thrust portion and parallel thereto, a retainer member of polyamide resin intermediate said axially-normal thrust portion and said fixed thrust member, said retainer member having end surfaces normal to the axis of said shaft and in thrust-bearing contact with said thrust portion and said fixed thrust member, said retainer member being provided with a plurality of peripherally-spaced cylindrical apertures having axes parallel to the axis of said shaft, said apertures having their openings on alternate end surfaces of said retainer and of a length less than the distance between said end surfaces, cylindrical bearing rollers in said apertures of a length less than the length of said aperture and in bearing contact with said shaft, an outer race in said cavity in abutting contact with said fixed thrust member and having an inner raceway in contact with said rollers and a ring member abutting said retainer and engaging said outer race to prevent axial displacement thereof.

References Cited in the file of this patent

UNITED STATES PATENTS

| | | |
|---|---|---|
| 1,884,299 | Searles et al. | Oct. 25, 1932 |
| 2,035,417 | Allendorff | Mar. 24, 1936 |
| 2,042,043 | Garelli | May 26, 1936 |
| 2,720,119 | Sherman | Oct. 11, 1955 |

FOREIGN PATENTS

| | | |
|---|---|---|
| 21,139 | Norway | June 15, 1910 |
| 660,399 | Great Britain | Nov. 7, 1951 |
| 993,520 | France | Nov. 2, 1951 |

OTHER REFERENCES

Product Engineering, July 1950, pages 102–107.